C. T. NORTON.
CLUTCH CONTROL LEVER.
APPLICATION FILED MAR. 26, 1920.
1,430,317.
Patented Sept. 26, 1922.
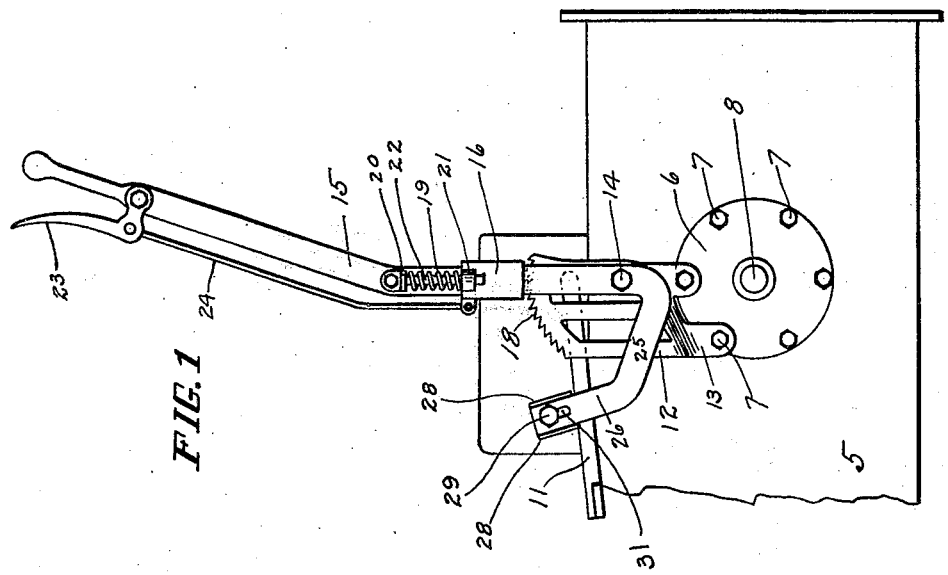
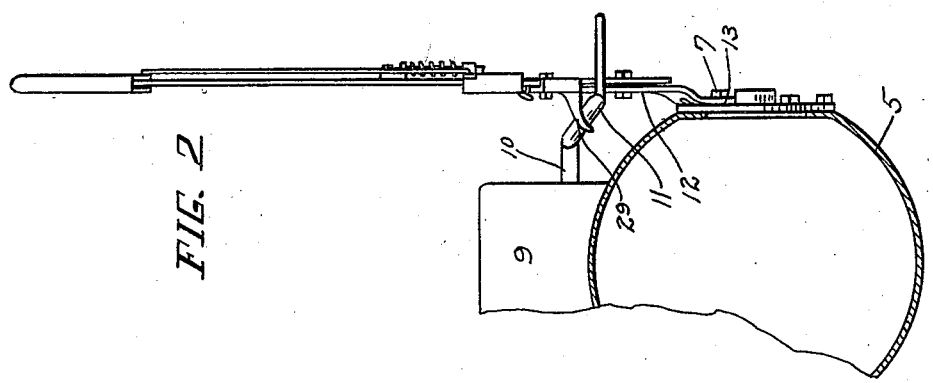
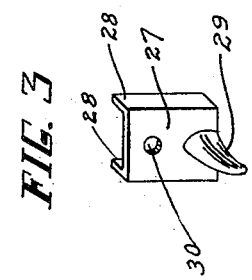
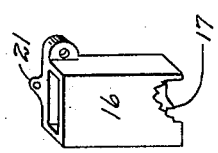
INVENTOR
*C. T. Norton*
BY
*Milton S. Crandall*
ATTORNEY Patented Sept. 26, 1922.

1,430,317

UNITED STATES PATENT OFFICE.

CLARENCE T. NORTON, OF MERRILL, IOWA.

CLUTCH-CONTROL LEVER.

Application filed March 26, 1920. Serial No. 368,836.

*To all whom it may concern:*

Be it known that I, CLARENCE T. NORTON, a citizen of the United States, and a resident of Merrill, in the county of Plymouth and State of Iowa, have invented certain new and useful Improvements in Clutch-Control Levers, of which the following is a specification.

In the operation of tractors it is frequently desirable to hold the clutch disengaged for quite a period of time while the motor is in operation which necessitates the drivers holding the clutch-pedal depressed.

My present invention has for its primary object the production of a hand lever particularly adapted to coact with the clutch-pedal, and so constructed as to hold the clutch-pedal in any desired position.

A further object of the invention is the production of a lever embodying certain novel features of construction and arrangement of parts particularly adapting it for application to the Fordson tractor to coact with the clutch control foot lever.

With these and other objects in view, the invention consisting in the construction, combination and novel arrangement of parts will be fully understood from the following description, reference being had to the accompanying drawings which form a part of this application and in which like characters of reference indicate corresponding parts throughout the several views, of which,—

Fig. 1 is a side elevation of the preferred form of the invention, and the portions of the tractor with which it is associated;

Fig. 2 is a rear elevation thereof;

Fig. 3 is an enlarged perspective view of the foot lever engaging lug; and

Fig. 4 is a similar view of the detent, a part thereof being broken away.

While I have illustrated and hereinafter described but one embodiment suitable for practicing the invention, I would not be understood as being limited to the specific structure chosen for illustration, for many alterations and modifications may be made in the details of construction and arrangement of parts herein disclosed, without departing from the spirit and scope of the invention, as defined in the appended claim.

Referring now to the illustrations, 5, represents the rear portion of a Fordson tractor motor having mounted on one side thereof a circular bearing plate, 6, secured to the part, 5, by bolts or cap screws, 7. In the said bearing plate is journaled a shaft, 8, which it will be understood is driven by the power transmission and carries a drive pulley (not shown). Upon the part, 5, is mounted the clutch lever shaft housing, 9, from the side of which protrudes the clutch lever shaft, 10, formed with a rearwardly extending foot lever, 11, which is retractably depressible to disengage the clutch.

The above described fragmentary structure represents no part of my present invention, but serves to illustrate those well known parts of a Fordson tractor with which the device of my invention is associated.

I provide a suitable quadrant, 12, having on its lower edge supporting flanges or ears, 13, adapted to rest against the outer face of the bearing plate, 6, and be secured thereto by two of the bolts or cap screws, 7. On the lower front portion of the quadrant I fulcrum at, 14, a hand lever, 15, which extends well above the quadrant and is provided with a suitable detent for engagement with the quadrant, consisting preferably of a block, 16, slidable upon the lever and having on its lower edge a tooth, 17, suitable to engage the teeth, 18, of the quadrant. The block is held normally in engagement with the quadrant by means of a compression spring, 19, interposed between a lateral ear, 20, on the hand lever, and an eye, 21, on the block, 16, the said ear, 20, being provided with a depending rod, 22, which passes freely through the spring and the eye, 21, to prevent displacement of the spring. The hand lever is provided with a suitable grip, 23, connected by a link, 24, with the detent block to withdraw the latter from the quadrant. The lower end portion, 25, of the hand lever is bent rearwardly and then upwardly, as at 26, and upon the portion, 26, is mounted a plate, 27, having flanges, 28, engageable with the front and rear edges of the said portion, 26. The plate, 27, is provided with an inwardly projecting part, 29, adapted to slidably engage the upper side of the foot lever, 11. The plate, 27, is secured to the lever portion, 26, by means of a bolt, 29, which passes through an opening, 30, in the plate and a long slot, 31, in the lever portion, 26, whereby the plate may be adjusted toward and from the foot lever.

It will now be observed that rearward movement of the hand lever depresses the foot lever, thus unclutching the clutch and the foot lever may be held depressed by engagement of the hand lever pawl with its quadrant.

Having thus described my invention what I claim as new and desire to secure by Letters Patent of the United States is,—

A clutch-control for a motor-vehicle having a supporting part, a clutch-lever-shaft and a foot-lever on the shaft, comprising a quadrant positioned adjacent the side of the foot-lever and mounted therebelow on the supporting part, a hand-lever fulcrumed on the quadrant below the clutch-lever-shaft, a part on the lower end of the hand-lever extended rearwardly and upwardly, a lug adjustably secured on the latter part, and a lateral arm on the lug operatively engageable with the foot-lever.

In testimony whereof I have hereunto set my hand this 2nd day of January, 1920.

CLARENCE T. NORTON.